(12) United States Patent
Suzuki et al.

(10) Patent No.: US 9,476,111 B2
(45) Date of Patent: Oct. 25, 2016

(54) HOT DIP GALVANIZED STEEL SHEET

(71) Applicant: JFE Steel Corporation, Tokyo (JP)

(72) Inventors: Yoshitsugu Suzuki, Tokyo (JP); Mai Miyata, Tokyo (JP); Yasunobu Nagataki, Tokyo (JP)

(73) Assignee: JFE Steel Corporation (JP)

( * ) Notice: Subject to any disclaimer, the term of this patent is extended or adjusted under 35 U.S.C. 154(b) by 0 days.

(21) Appl. No.: 14/654,890

(22) PCT Filed: Dec. 24, 2013

(86) PCT No.: PCT/JP2013/007532
§ 371 (c)(1),
(2) Date: Jun. 23, 2015

(87) PCT Pub. No.: WO2014/103279
PCT Pub. Date: Jul. 3, 2014

(65) Prior Publication Data
US 2015/0337427 A1  Nov. 26, 2015

(30) Foreign Application Priority Data
Dec. 27, 2012  (JP) .................. 2012-285182

(51) Int. Cl.
| | | |
|---|---|---|
| *C23C 2/06* | (2006.01) | |
| *C22C 38/06* | (2006.01) | |
| *C22C 38/02* | (2006.01) | |
| *C22C 38/00* | (2006.01) | |
| *C22C 38/12* | (2006.01) | |
| *C22C 38/04* | (2006.01) | |
| *B32B 15/01* | (2006.01) | |
| *C23C 2/40* | (2006.01) | |
| *C22C 18/04* | (2006.01) | |
| *C21D 8/02* | (2006.01) | |
| *C23C 2/28* | (2006.01) | |
| *C21D 9/46* | (2006.01) | |

(52) U.S. Cl.
CPC ............ *C22C 38/12* (2013.01); *B32B 15/012* (2013.01); *B32B 15/013* (2013.01); *C21D 8/0278* (2013.01); *C22C 18/04* (2013.01); *C22C 38/00* (2013.01); *C22C 38/001* (2013.01); *C22C 38/02* (2013.01); *C22C 38/04* (2013.01); *C22C 38/06* (2013.01); *C23C 2/06* (2013.01); *C23C 2/28* (2013.01); *C23C 2/40* (2013.01); *C21D 9/46* (2013.01); *Y10T 428/1259* (2015.01); *Y10T 428/12611* (2015.01); *Y10T 428/12618* (2015.01); *Y10T 428/12757* (2015.01); *Y10T 428/12799* (2015.01); *Y10T 428/12951* (2015.01); *Y10T 428/12958* (2015.01); *Y10T 428/12965* (2015.01); *Y10T 428/12972* (2015.01); *Y10T 428/12993* (2015.01); *Y10T 428/26* (2015.01); *Y10T 428/263* (2015.01); *Y10T 428/264* (2015.01); *Y10T 428/27* (2015.01)

(58) Field of Classification Search
CPC ............ C23C 2/06; C23C 2/28; C23C 2/40; C23C 30/00; C23C 30/005; C22C 18/00; C22C 18/04; C22C 38/00; C22C 38/001; C22C 38/02; C22C 38/04; C22C 38/06; C22C 38/12; Y10T 428/12799; Y10T 428/12993; Y10T 428/12951; Y10T 428/12958; Y10T 428/12965; Y10T 428/12972; Y10T 428/12757; Y10T 428/12611; Y10T 428/12618; Y10T 428/1259; Y10T 428/27; Y10T 428/26; Y10T 428/263; Y10T 428/264; B32B 15/013; B32B 15/012; B32B 15/01; B32B 15/04; B32B 15/0432; B32B 15/18
See application file for complete search history.

(56) References Cited

U.S. PATENT DOCUMENTS 6,368,728 B1 * 4/2002 Tobiyama .............. C23C 2/28
148/533
2011/0256420 A1 * 10/2011 Li .......................... C23C 2/06
428/659

FOREIGN PATENT DOCUMENTS

| | | |
|---|---|---|
| EP | 2 495 346 | 9/2012 |
| JP | 11-323492 A | 11/1999 |
| JP | 2004-315965 A | 11/2004 |
| JP | 2008-024980 A | 2/2008 |
| WO | 2014/091724 | 6/2014 |

OTHER PUBLICATIONS

Kuang-Kuo Wang et al., "Heteroepitaxial growth of $Fe_2Al_5$ inhibition layer in hot-dip galvanizing of an interstitial-free steel," Thin Solid Films, vol. 518, No. 8, Feb. 1, 2010, pp. 1935-1942 (Abstract only).

Supplementary European Search Report dated Oct. 22, 2015 of corresponding European Application No. 13867191.2.

* cited by examiner

*Primary Examiner* — Michael E La Villa
(74) *Attorney, Agent, or Firm* — DLA Piper LLP (US)

(57) ABSTRACT

A hot dip galvanized steel sheet includes a steel sheet, a hot dip galvanizing layer, and an intermetallic compound, in which the steel sheet has a chemical composition containing, by mass %, C: 0.03% or more and 0.70% or less, Si: 0.10% or less, Mn: 0.5% or more and 0.9% or less, P: 0.020% or more and 0.050% or less, S: 0.010% or less, Nb: 0.010% or more and 0.035% or less, N: 0.005% or less, Al: 0.10% or less, and the balance being Fe and inevitable impurities, in which the hot dip galvanizing layer contains 0.3% or more and 0.6% or less of Al, and in which the intermetallic compound contains 0.12 $gm^{-2}$ or more and 0.22 $gm^{-2}$ or less of Al and $Fe_2Al_5$ having an average grain diameter of 1 μm or less.

2 Claims, No Drawings

HOT DIP GALVANIZED STEEL SHEET

TECHNICAL FIELD

This disclosure relates to a hot dip galvanized steel sheet used in the fields of, for example, automobile, domestic electric appliance, and building material industries and, in particular, can be preferably used for the outer panel and inner panel of an automobile.

BACKGROUND

Nowadays, surface-treated steel sheets manufactured by giving corrosion resistance to raw material steel sheets are being used in the fields of, for example, automobile, domestic electric appliance, and building material industries. Among the surface-treated steel sheets described above, hot dip galvanized steel sheets, which are excellent in terms of corrosion resistance, are being favorably used. In particular, car makers in Europe and the United States are thinking of increasing the corrosion resistance of raw material steel sheets by using hot dip galvanized steel sheets whose coating thickness can be easily increased. In addition, a large demand for automotive steel sheets is expected in the East Asia region, which is showing significant economic growth.

In addition, in automotive steel sheets, which are strictly required to have excellent workability, it is not possible to achieve sufficient durability for products unless coating adhesiveness after press working has been performed and after-painting corrosion resistance after press working has been performed are excellent.

Also, high-strength steel sheets, which are used as, in particular, strength members, are required to have sufficient press workability against intense working and satisfactory corrosion resistance in a portion which has been subjected to press working. Therefore, the coating adhesiveness in the worked portion mentioned above is very important.

Japanese Unexamined Patent Application Publication No. 2004-315965 discloses a method of manufacturing a hot dip galvanized steel sheet excellent in terms of slidability when press working is performed in which the amount of Al in a hot dip galvanizing layer and the amount of Al at the interface between the coated layer and the steel sheet are specified. However, in JP '965, sufficient consideration is not given to the durability of products related to, for example, coating adhesiveness in a worked portion after press working has been performed and corrosion resistance after press working has been performed.

Currently, as described above, it is difficult to obtain steel sheets having durability by giving the steel sheet excellent coating adhesiveness after press working has been performed and after-painting corrosion resistance after press working has been performed.

In addition, since hot dip galvanized steel sheets are used in the fields of, for example, automobile, domestic electric appliance, and building material industries, hot dip galvanized steel sheets are also required to have excellent after-painting beautiful appearance and spot weldability.

It could therefore be helpful to provide a hot dip galvanized steel sheet excellent in terms of coating adhesiveness after press working has been performed, spot weldability, after-painting corrosion resistance after press working has been performed, and after-painting beautiful appearance.

SUMMARY

We found that, by controlling the structure of a hot dip galvanizing layer instead of simply performing a galvanization treatment as with conventional techniques to form an intermetallic compound having specified properties between the steel sheet and the hot dip galvanizing layer, or preferably by controlling the solidification structure and surface texture of the hot dip galvanizing layer and by controlling the state of internal oxidation in the surface portion of the base steel sheet, it is possible to obtain a hot dip galvanized steel sheet excellent in terms of coating adhesiveness after press working has been performed, spot weldability, after-painting corrosion resistance in a worked portion after press working has been performed, and after-painting beautiful appearance.

We thus provide:

a hot dip galvanized steel sheet includes a steel sheet (base steel sheet) having a chemical composition containing, by mass %, C: 0.03% or more and 0.07% or less, Si: 0.10% or less, Mn: 0.5% or more and 0.9% or less, P: 0.020% or more and 0.050% or less, S: 0.010% or less, Nb: 0.010% or more and 0.035% or less, N: 0.005% or less, Al: 0.10% or less, and the balance being Fe and inevitable impurities, a hot dip galvanizing layer containing 0.3% or more and 0.6% or less of Al which is formed on the surface of the steel sheet, and an intermetallic compound containing 0.12 gm$^{-2}$ or more and 0.22 gm$^{-2}$ or less of Al and Fe$_2$Al$_5$ having an average grain diameter of 1 µm or less, the intermetallic compound being present between the steel sheet and the hot dip galvanizing layer, in which a yield stress (YS) is 340 MPa or more and 420 MPa or less.

It is preferable that the hot dip galvanized steel sheet have a surface roughness Ra of the surface of the hot dip galvanizing layer of 0.8 µm or more and 1.6 µm or less, a glossiness (G value) of the surface of the hot dip galvanizing layer is 550 or more and 750 or less, an orientation ratio (Zn(002)/(004)) of the zinc basic plane, which is the ratio of the crystal orientation degree in the (002) plane of a Zn crystal to the crystal orientation degree in the (004) plane of a Zn crystal, of 60% or more and 90% or less on the surface of the hot dip galvanizing layer, and an internal oxidation amount of 0.050 g/m$^2$ or less in the surface portion of the base steel sheet.

The hot dip galvanized steel sheet is excellent in terms of coating adhesiveness after press working has been performed, spot weldability, after-painting corrosion resistance after press working has been performed, and after-painting beautiful appearance.

DETAILED DESCRIPTION

Our steel sheets will be specifically described hereafter. However, this disclosure is not limited to the examples described below.

The hot dip galvanized steel sheet has a steel sheet (also referred to as "base steel sheet"), a hot dip galvanizing layer formed on the surface of the steel sheet, and an intermetallic compound present between the steel sheet and the hot dip galvanizing layer.

Steel Sheet

The steel sheet has a chemical composition containing, by mass %, C: 0.03% or more and 0.07% or less, Si: 0.10% or less, Mn: 0.5% or more and 0.9% or less, P: 0.020% or more and 0.050% or less, S: 0.010% or less, Nb: 0.010% or more and 0.035% or less, N: 0.005% or less, Al: 0.10% or less, and the balance being Fe and inevitable impurities. The chemical composition described above will be described hereafter. "%" used when describing a chemical composition means "mass %," unless otherwise noted.

C: 0.03% or More and 0.07% or Less

The C content contributes to an increase in the strength of a steel sheet. It is necessary that the C content be 0.03% or more to realize the increase in strength. On the other hand, when the C content is large, since there is an increase in the amount of solid solute C, there is an increase in yield point elongation (YP-EL) after accelerated aging has been performed. Also, a high C content significantly decreases weldability. Therefore, it is necessary that the C content be 0.07% or less.

Si: 0.10% or Less

When the Si content is large, there is a decrease in coating adhesiveness of a steel sheet after press working has been performed due to formation of Si oxides when annealing is performed. Therefore, it is necessary that the Si content be 0.10% or less, or preferably 0.03% or less.

Mn: 0.5% or More and 0.9% or Less

Mn contributes to an increase in the strength of a steel sheet through solid solution strengthening. In addition, Mn decreases the amount of solid solute C by decreasing the grain diameter of a cementite phase as a result of inhibiting the diffusion of C, which results in an increase in yield point elongation (YP-EL) after accelerated aging has been performed. Moreover, Mn is effective in rendering harmful S in steel harmless by forming MnS. It is necessary that the Mn content be 0.5% or more to realize such an effect. On the other hand, large Mn content decreases ductility due to an increase in hardness. Also, since large Mn content causes formation of Mn oxides when annealing is performed, there is a decrease in the coating adhesiveness of a steel sheet after press working has been performed. Therefore, it is necessary that the Mn content be 0.9% or less.

P: 0.020% or More and 0.050% or Less

P contributes to an increase in the strength of a steel sheet as a solid solution strengthening chemical element. It is necessary that the P content be 0.020% or more to realize such an effect. However, since P may decrease the ductility or toughness of a steel sheet, it is necessary that the P content be 0.050% or less.

S: 0.010% or Less

When the S content is large, there is a decrease in toughness in a weld zone. Therefore, the upper limit of the S content is 0.010%. It is preferable that the S content is 0.007% or less.

Nb: 0.010% or More and 0.035% or Less

Nb contributes to an increase in the hardness by forming fine carbides with C. It is necessary that the Nb content be 0.010% or more to realize such an effect. On the other hand, large Nb content decreases bake hardenability by decreasing the amount of solid solute C. Also, large Nb content causes difficulty in rolling by increasing resistance to deformation when hot working is performed. Therefore, the Nb content is 0.035% or less.

N: 0.005% or Less and Al: 0.10% or Less

Al (sol. Al) and N do not decrease the desired effects as long as their contents are within the range for a common steel sheet. In addition, N combines with Ti to form TiN and combines with Al to form AlN. However, when the N content is more than 0.01%, since these nitrides are dispersed in ferrite grains, there is a decrease in the work hardening ratio. Therefore, the Al content is 0.10% or less, and the N content is 0.005% or less. When the Al content is more than 0.10%, formation of intermetallic compounds described below is inhibited, and there is a decrease in coating adhesiveness after press working has been performed due to an increase in the grain diameter of each crystal in the microstructure of a steel sheet as a result of Al inhibiting crystal nucleation. In addition, when the N content is more than 0.005%, since nitrides are dispersed in ferrite grains, there is a decrease in the work hardening ratio. It is preferable that the Al content be 0.04% or less.

Hot Dip Galvanizing Layer

"Hot dip galvanizing layer" refers to a hot dip galvanizing layer formed by performing an ordinary galvanization treatment. In addition, a hot dip galvanizing layer contains 0.3% or more and 0.6% or less of Al. Constituents other than Zn and Al may be contained in a hot dip galvanizing layer as long as the desired effects are not decreased. Examples of constituents other than Zn and Al include Fe, Mg, and Cr. "%" refers to "mass %."

When the Al content is less than 0.3%, it is necessary to decrease Al concentration in a galvanization bath. When the Al concentration is small, since elution of Fe occurs, beautiful appearance deterioration occurs due to dross being precipitated, and hard dross is dispersed in a hot dip galvanizing layer. When dross is dispersed in a hot dip galvanizing layer, since the dross comes into contact with a mold when press working is performed, there is a decrease in the press workability of a hot dip galvanized steel sheet. When the Al content is more than 0.6%, since a large amount of Al oxide layer is formed on the surface of the hot dip galvanizing layer, there is a decrease in the spot weldability of the hot dip galvanized steel sheet.

It is preferable that the surface roughness Ra of a hot dip galvanizing layer be 0.8 μm or more and 1.6 μm or less. When the surface roughness Ra is less than 0.8 μm, since oil is not held on the surface of the hot dip galvanizing layer when pressing is performed on the hot dip galvanized steel sheet, there may be a decrease in press workability. When the surface roughness Ra is more than 1.6 μm, since there is a decrease in after-painting sharpness and coating adhesiveness after press working has been performed, excellent beautiful appearance may not be given to the hot dip galvanized steel sheet after painting has been performed. The surface roughness Ra described above refers to the surface roughness Ra which is determined using the method described in the Examples.

It is preferable that the glossiness (G value) of the surface of the hot dip galvanizing layer be 550 or more and 750 or less. When the glossiness (G value) mentioned above is less than 550, since there is a decrease in after-painting sharpness, excellent beautiful appearance may not be given to the hot dip galvanized steel sheet after painting has been performed. When the glossiness (G value) is 750 or more, since oil is not held on the surface of the hot dip galvanizing layer due to the surface being excessively smooth when pressing is performed on the hot dip galvanized steel sheet, there may be a decrease in press workability. The glossiness (G value) refers to the glossiness (G value) which is determined using a gloss meter as described in

EXAMPLES

It is preferable that an orientation ratio (Zn(002)/(004)) of the zinc basic plane, which is the ratio of the crystal orientation degree in the (002) plane of a Zn crystal to the crystal orientation degree in the (004) plane of a Zn crystal, be 60% or more and 90% or less on the surface of the hot dip galvanizing layer. When where the orientation ratio of the zinc basic plane is less than 60%, since the orientations of Zn crystal are comparatively random, there is a decrease in crystal size when zinc is solidified immediately after galvanization has been performed. Therefore, when the orientation ratio of the zinc basic plane is less than 60%, since oil is not held on the surface of the hot dip galvanizing layer due to the surface of the hot dip galvanizing layer being excessively smooth when pressing is performed, there may be a decrease in press workability. When the orientation ratio of the zinc basic plane is more than 90%, crystal grains tend to excessively grow due to the orientation ratio of the zinc basic plane being excessively high, which results in dendrite arms growing. Therefore, when the orientation ratio of the zinc basic plane is more than 90%, since there is a decrease in after-painting sharpness, the beautiful appearance of the hot dip galvanized steel sheet may deteriorate after painting has been performed and, in addition, there may also be decrease in corrosion resistance. The orientation ratio of the zinc basic plane can be defined by:

$$\text{Orientation of a zinc crystal in the } (xyz) \text{ plane} = \frac{I_{(xyz)}/I_{std(xyz)}}{\sum (I_{(xyz)}/I_{std(xyz)})} \times 100(\%).$$

The orientation ratio of the zinc basic plane (Zn(002)/(004)) expresses {the orientation degree of a zinc crystal in the (002) plane}/{the orientation degree of a zinc crystal in the (004) plane}. In addition, $I_{(xyz)}$ denotes the Zn intensity of a sample on the (xyz) plane which is determined using an X-ray, $I_{std(xyz)}$ denotes the Zn intensity of a standard sample (pure Zn powder) on the (xyz) plane which is determined using an X-ray, and $\Sigma$ denotes the sum of the intensities of all the orientations.

By defining the orientation ratio of the zinc basic plane as described above, it is possible to determine to what degree crystals orientate at random considering that Zn has a hcp structure and ordinarily tends to orientate in the basic plane. Since this degree of the orientation of a solidification structure influences glossiness, crystal size, and the roughness of a surface (surface roughness), it is important to precisely control the orientation ratio of the zinc basic plane not only to control the surface quality of a hot dip galvanized steel sheet but also to control press workability.

It is appropriate that a hot dip galvanizing layer be formed on the surface of a steel sheet. Since a hot dip galvanizing layer is formed on the surface of a steel sheet using a method in which the steel sheet is dipped into a galvanization bath, a hot dip galvanizing layer is ordinarily formed on the whole surface of the steel sheet. There may be an area on the surface of a steel sheet in which a hot dip galvanizing layer is not formed as long as the desired effects are not decreased.

There is no particular limitation on the thickness of a hot dip galvanizing layer. The thickness of a hot dip galvanizing layer can be adjusted by controlling a coating weight when a galvanization treatment is performed.

Intermetallic Compound

An intermetallic compound is composed of an intermetallic compound containing $Fe_2Al_5$ having an average grain diameter of 1 μm or less and is present between a steel sheet and a hot dip galvanizing layer. In addition, the intermetallic compound contains 0.12 $gm^{-2}$ or more and 0.22 $gm^{-2}$ or less of Al. As a result of the intermetallic compound containing $Fe_2Al_5$ being present, the effect of achieving satisfactory coating adhesiveness as a result of formation of an FeZn-alloy phase can be inhibited. When an intermetallic compound other than the intermetallic compound containing $Fe_2Al_5$ is used, since such an intermetallic compound is hard and brittle in most cases, the effect described above cannot be realized. Also, when an intermetallic compound other than the intermetallic compound containing $Fe_2Al_5$ is used, since a hard and brittle FeZn-intermetallic compound may be formed, there is a decrease in coating adhesiveness in this case. In addition, it is appropriate that the content of $Fe_2Al_5$ be controlled as needed to realize the desired effects. It can be confirmed that the intermetallic compound is present by using a method in which the intermetallic compound is detected by performing analysis using an electron diffraction method in a transmission electron microscopic field in the vicinity of the interface between the steel sheet and the hot dip galvanizing layer in the cross section of the hot dip galvanizing layer. The intermetallic compound is present between the steel sheet and the hot dip galvanizing layer in the form of a compound layer. However, when the amount of the intermetallic compound is less than the amount specified above, the intermetallic compound cannot be present in the form of a layer and is sparsely distributed.

When the average grain diameter of $Fe_2Al_5$ is more than 1 μm, since this means that the hard intermetallic compound has grown excessively, there is a decrease in the impact resistance of a hot dip galvanized steel sheet. Therefore, the upper limit of the average grain diameter described above is set to be 1 μm.

When the Al content in the intermetallic compound is less than 0.12 $gm^{-2}$, it is necessary to control Al concentration in a galvanization bath to be low. When the Al content in the intermetallic compound is less than 0.12 $gm^{-2}$, since dross is precipitated, there is a decrease in the beautiful appearance quality of a hot dip galvanized steel sheet, press workability, coating adhesiveness after press working has been performed, and corrosion resistance of a hot dip galvanized steel sheet. When the Al content is more than 0.22 $gm^{-2}$, it is necessary to control the Al concentration in a galvanization bath to be high. When the Al content is more than 0.22 $gm^{-2}$, since a large amount of Al oxide layer is formed on the surface of a hot dip galvanizing layer, there is a decrease in spot weldability.

Physical Properties of Hot Dip Galvanized Steel Sheet

The hot dip galvanized steel sheet is excellent in terms of coating adhesiveness after press working has been performed, spot weldability, and after-painting corrosion resistance in a worked portion after press working has been performed and, in addition, the hot dip galvanized steel sheet has excellent after-painting beautiful appearance. Therefore, the hot dip galvanized steel sheet can also be applied to products such as a back door and a hood having portions which are subjected to very intense working.

In addition, the hot dip galvanized steel sheet has a yield stress (YS) of 340 MPa or more and 420 MPa or less. When the yield stress is within the range mentioned above, the hot dip galvanized steel sheet can also be preferably used mainly in applications such as an inner panel in which intense working is required and in which it is necessary to achieve shape fixability. It is preferable that the yield stress be 350 MPa or more and 365 MPa or less. Regarding mechanical properties, it is more preferable that the TS (tensile strength) be 420 MPa or more and that the El (elongation) be 25% or more.

In addition, to further increase coating adhesiveness, it is preferable that an internal oxidation amount in the surface portion of the base steel sheet be 0.050 $g/m^2$ or less per side after a hot dip galvanizing layer has been removed. Internal oxidation occurs in a manner such that easily oxidized chemical elements such as Si, Mn, Al, and P, which are added in steel, are oxidized in, for example, a hot rolling process and an annealing process in a CGL. Therefore, it is necessary that a coiling temperature not be excessively increased when hot rolling is performed and the dewpoint of an annealing atmosphere in a CGL not be excessively increased. When the internal oxidation amount is large, since there is a decrease in the toughness of the grain boundaries in a worked portion after press working has been performed, there may be a decrease in coating adhesiveness after press working has been performed and, further, there may be a decrease in spot weldability. "The surface portion of the base steel sheet" refers to a range within 50 μm in the direction of the thickness of the steel sheet from the interface between the hot dip galvanizing layer and the steel sheet.

There is no particular limitation on what method is used to remove the hot dip galvanizing layer to determine the internal oxidation amount. The removing treatment may be performed using an acid or an alkali. However, it is necessary to add an inhibitor (an agent which prevents the base steel sheet from being dissolved) to make sure that the portion of the base steel sheet is not removed. In addition, it is necessary to make sure that the surface of the base steel sheet is not oxidized after the hot dip galvanizing layer has been removed. For example, a hot dip galvanizing layer may be removed using a solution composed of 195 cc of an aqueous solution containing 20 mass % of NaOH and 10 mass % of triethanolamine and 7 cc of an aqueous solution containing 35 mass % of $H_2O_2$. For another example, a diluted HCl solution containing an inhibitor may be used.

The internal oxidation amount can be obtained by determining the amount of oxygen in the surface portion of the base steel sheet after the hot dip galvanizing layer has been removed. The amount of the internal oxides in the surface portion of the base steel sheet is determined by using, for example, "an impulse furnace melting-infrared absorption method." However, it is necessary to subtract the amount of oxygen contained in the base material from the determined amount to precisely estimate the internal oxidation amount immediately under the hot dip galvanizing layer. Therefore, using a sample prepared by removing a portion having a thickness of 100 μm or more by performing mechanical polishing from the upper and lower surfaces of the surface portion of the base steel sheet of the sample from which the hot dip galvanizing layer has been removed in the same manner described above, by separately determining the amount of oxygen in the steel, by calculating the increase in weight due to oxidation only of the surface portion by subtracting the amount of oxygen of the sample from the amount of oxides in the surface portion of the base steel sheet after the hot dip galvanizing layer has been removed, and by converting the calculated increase in weight into a value per unit area, the value (of an internal oxidation amount) is obtained.

Method of Manufacturing Hot Dip Galvanized Steel Sheet

Subsequently, a method of manufacturing a hot dip galvanized steel sheet will be described. For example, it is possible to manufacture a hot dip galvanized steel sheet using the following method. First, steel having the chemical composition described above is made into a slab using a continuous casting method, the slab is heated, scale is removed, and then rough rolling is performed. Subsequently, after cooling has been performed, finish rolling is performed, the rolled steel sheet is cooled and coiled, and then pickling and cold rolling are performed. Subsequently, the steel sheet is subjected to annealing and a galvanization treatment in a continuous galvanization facility.

For example, a heating time and a heating temperature when a slab is heated, rough rolling conditions, cooling conditions, finish rolling conditions, and coiling conditions may be appropriately controlled using technological common knowledge. However, it is preferable that the finish rolling (hot rolling) conditions and the coiling temperature be controlled to control the internal oxidation amount in the surface portion of the base steel sheet to be within the range described above.

In addition, conditions used to anneal a steel sheet influence the yield stress of a hot dip galvanized steel sheet. It is preferable that a heating temperature (which is referred to as an annealing temperature and which refers to the maximum end-point temperature of the steel sheet) be controlled to be 760° C. or higher and 840° C. or lower when annealing is performed to control the yield stress to be within the range described above.

In addition, although an annealing atmosphere may be appropriately controlled, it is preferable that the dewpoint be controlled to be −55° C. or higher and 0° C. or lower. It is not preferable that the dewpoint be higher than 0° C., because the surface of a furnace body tends to become brittle. It is not preferable that the dewpoint be lower than −55° C., because it is technologically difficult to maintain airtightness.

In addition, it is preferable that the hydrogen concentration in the annealing atmosphere be 1 vol % or more and 50 vol % or less. It is preferable that the hydrogen concentration be 1 vol % or more, because the surface of a steel sheet is activated. It is not preferable that the hydrogen concentration be 50 vol % or more, because there is an economic disadvantage. The atmosphere usually contains $N_2$ other than hydrogen. Examples of inevitable constituents include $H_2$, $CO_2$, CO, and $O_2$.

It is necessary to control conditions of a galvanization treatment so that an intermetallic compound is formed between a steel sheet and a hot dip galvanizing layer by controlling Al content in the hot dip galvanizing layer. Also, it is necessary to control conditions of a galvanization treatment to control the surface properties (surface roughness Ra, glossiness (G value) of the hot dip galvanizing layer, and the orientation ratio of the zinc basic plane) to be in the desired states. The conditions of a galvanization treatment will be described hereafter.

There is no particular limitation on the temperature of an entering steel sheet which is the temperature of the steel sheet when the steel sheet enters into a galvanization bath after annealing has been performed. It is preferable that the temperature of the entering steel sheet be equal to or higher than the temperature of the galvanization bath (bath temperature) −20° C. and equal to or lower than the bath temperature +20° C. When the temperature of an entering steel sheet is within the range described above, since there is only a small change in the bath temperature, it is easy to continuously perform the desired galvanization treatment. There is a tendency for the Al content in a hot dip galvanizing layer and the Al content in an intermetallic compound to decrease with increasing bath temperature. In addition, there is a tendency for glossiness of the surface of a hot dip galvanizing layer to increase with increasing bath temperature.

As long as the chemical composition of the galvanization bath into which a steel sheet enters after annealing has been performed contains Al other than Zn, the chemical composition may contain other constituents as needed. There is no particular limitation on Al concentration in the galvanization bath. It is preferable that the Al concentration in the galvanization bath be 0.16 mass % or more and 0.25 mass % or less. It is preferable that the Al concentration be within the range described above because formation of an FeZn-alloy phase is prevented as a result of an FeAl-alloy phase being formed. Glossiness can be adjusted by controlling the Al concentration in the galvanization bath. When the Al concentration in the galvanization bath is low, FeZn crystal is formed instead of FeAl at the interface. Since FeZn crystal is used as a nucleation site of Zn solidification, a large number of Zn crystals are formed, which results in there being a tendency for an orientation ratio to decrease due to the orientation of zinc crystals becoming random. As a result, since the lower the Al concentration, the more likely the dendritic growth of Zn crystals is to be prevented, there is a decrease in surface asperity so that the surface becomes smooth, which results in an increase in glossiness. It is more preferable that the Al concentration be 0.19 mass % or more and 0.22 mass % or less. Since the Al concentration influences the Al content in a hot dip galvanizing layer and the Al content in an intermetallic compound, it is preferable that the Al concentration be determined also in consideration of these contents.

There is no particular limitation on the temperature of a galvanization bath (bath temperature). It is preferable that the bath temperature mentioned above be 430° C. or higher and 470° C. or lower. It is preferable that the bath temperature be 430° C. or higher because Zn is not solidified and is stably kept melted, and it is preferable that the bath temperature be 470° C. or lower because there is a decrease in the amount of a dross defect due to the elution of Fe being less likely to occur. It is more preferable that the bath temperature be 450° C. or higher and 465° C. or lower.

There is no particular limitation on dipping time for which a steel sheet is dipped in the galvanization bath. It is preferable that the dipping time be 0.1 seconds or more and 5 seconds or less. By controlling the dipping time to be within the range described above, it is easy to form the desired hot dip galvanizing layer on the surface of a steel sheet.

Coating weight is adjusted using, for example, a gas jet wiping method immediately after a steel sheet has been pulled up from the galvanization bath. Although there is no particular limitation on the coating weight, it is preferable that the coating weight be 20 g/m$^2$ or more and 120 g/m$^2$ or less. When the coating weight is less than 20 g/m$^2$, it may be difficult to achieve sufficient corrosion resistance. On the other hand, when the coating weight is more than 120 g/m$^2$, there may be a decrease in plating peeling resistance.

After the coating weight has been adjusted as described above, skin pass rolling (hereafter referred to as SK treatment) is performed. There is no particular limitation on what kind of rolls are used for an SK treatment, and, for example, Electro-Discharge Texture rolls (EDT rolls), Electron Beam Texture rolls (EBT rolls), shot dull rolls, and Topochrome rolls may be used.

Also, there is no particular limitation on rolling reduction (SK rolling reduction (%)) when an SK treatment is performed. It is preferable that the SK rolling reduction be 0.7% to 0.9%. When the SK rolling reduction is within the range described above, it is easy to control surface roughness to be within the desired range described above. In addition, when the SK rolling reduction is out of the range described above since dull groove in which rolling oil is held may not be formed, there may be a decrease in press workability. Also, when the SK rolling reduction is out of the range described above, there may be a decrease in yield strength.

It is preferable that a cooling rate be −5° C./second or more and −30° C./second or less when cooling is performed immediately after a steel sheet has been pulled up from the galvanization bath.

As above, the hot dip galvanized steel sheet has been described, and the usage of the hot dip galvanized steel sheet will be described hereafter.

Since the hot dip galvanized steel sheet is excellent in terms of after-painting corrosion resistance after press working has been performed, it is preferable that the hot dip galvanized steel sheet be used for applications in which a paint film is formed on the surface of a hot dip galvanizing layer. In addition, since the hot dip galvanized steel sheet is excellent in terms of coating adhesiveness even when the hot dip galvanized steel sheet is used for applications in which workability for intense working is required, there is not a marked decrease in corrosion resistance or mechanical properties. Examples of applications in which workability for intense working is required and in which a paint film is formed include an application as an automotive steel sheet for the outer panel and inner panel of an automobile. There is no particular limitation on what kind of method is used to form a paint film. It is preferable that a chemical conversion treatment be performed on the surface of a hot dip galvanizing layer to form a chemical conversion coating film and that a paint film be formed thereafter on the chemical conversion coating film.

Among solutions for a chemical conversion treatment, both painting type solutions and reactive type solutions may be used. In addition, there is no particular limitation on what kind of constituents are contained in the solutions for a chemical conversion treatment, and a chromate treatment solution or a chrome-free treatment solution may be used. In addition, a chemical conversion coating film may be a single layer or a multilayer.

There is no particular limitation on what kind of painting method is used for forming a paint film. Examples of painting methods include electro-coating, roll coater painting, curtain flow painting, and spray painting. In addition, hot-air drying, infrared ray drying, induction heating, or the like may be used to dry paint.

EXAMPLES

Our steel sheets and methods will be specifically described using examples hereafter. However, this disclosure is not limited to the examples described below.

Using steel chemical compositions given in Table 1, hot-rolled steel sheets were manufactured by performing coiling at the coiling temperatures (hereinafter called CT) given in Table 2 (in the present description, both Table 2-1 and Table 2-2 are referred to as Table 2). The black scale of the obtained hot-rolled steel sheets was removed by performing pickling. Then, the hot-rolled steel sheets having thicknesses of 2.3 mm and 4.5 mm were subjected to cold rolling respectively with rolling reductions of 65% and 60% to reduce the thicknesses to 0.8 mm and 1.8 mm. Subsequently, the surfaces of the cold-rolled steel sheets were degreased at the entrance of a CGL (continuous hot dip galvanizing line), and annealing and a galvanization treatment were performed under the conditions given in Table 2 to manufacture hot dip galvanized steel sheets. The bath temperature and the Al content in the bath were appropriately varied. EDT rolls were used for an SK treatment, and the rolling reduction was appropriately varied. The coating weight was 55 g/m$^2$ per side. After having pulled up the steel sheets from the galvanization bath and having adjusted the coating weight using a gas jet wiping method, the SK treatment was performed under the conditions given in Table 2 before cooling was performed.

TABLE 1

Unit: mass %

| Steel Code | C | Si | Mn | P | S | N | Al | Nb | Note |
|---|---|---|---|---|---|---|---|---|---|
| A | 0.05 | 0.01 | 0.7 | 0.035 | 0.007 | 0.002 | 0.04 | 0.020 | Example |
| B | 0.01 | 0.01 | 0.3 | 0.035 | 0.007 | 0.001 | 0.04 | 0.020 | Comparative Example |
| C | 0.15 | 0.50 | 0.7 | 0.035 | 0.007 | 0.003 | 0.04 | 0.020 | Comparative Example |
| D | 0.05 | 0.01 | 0.7 | 0.150 | 0.007 | 0.004 | 0.04 | 0.050 | Comparative Example |
| E | 0.05 | 0.01 | 0.7 | 0.035 | 0.007 | 0.002 | 0.60 | 0.020 | Comparative Example |
| F | 0.03 | 0.01 | 0.9 | 0.025 | 0.002 | 0.001 | 0.06 | 0.016 | Example |
| G | 0.07 | 0.01 | 0.5 | 0.035 | 0.005 | 0.004 | 0.03 | 0.030 | Example |

Using the hot dip galvanized steel sheets obtained as described above, the following determinations were performed.

The chemical composition of an intermetallic compound was identified using an X-ray diffraction method on the surface of the steel sheet from which a hot dip galvanizing layer was removed using fuming nitric acid. Using a sample which had been prepared by dissolving, using dilute hydrochloric acid, the surface of an intermetallic compound on the surface of the sample which had been prepared in the similar way as described above, the amount of the constituents of the intermetallic compound was determined using ICP. The Al content in a hot dip galvanizing layer was also determined using ICP, using a sample which had been dissolved using dilute hydrochloric acid.

The grain diameter of an intermetallic compound was determined using the following method. By collecting a test piece from the hot dip galvanized steel sheet, and by observing a microstructure in a cross section parallel to the rolling direction using a scanning electron microscope (SEM) at a magnification of 5000 times, the average grain diameter of an intermetallic compound was determined. The results are given in Table 2.

To determine an internal oxidation amount, first, by removing a hot dip galvanizing layer using a solution composed of 195 cc of an aqueous solution containing 20 mass % of NaOH and 10 mass % of tri-ethanolamine and 7 cc of an aqueous solution containing 35 mass % of $H_2O_2$, the amount of oxygen in the surface portion of the base steel sheet from which a hot dip galvanizing layer had been removed was determined using an impulse furnace melting-infrared absorption method. However, it is necessary to subtract the amount of oxygen contained in the base material from the determined amount to precisely estimate the internal oxidation amount immediately under the hot dip galvanizing layer. Therefore, using a sample prepared by removing a thickness of 100 µm or more by performing mechanical polishing from the upper and lower surfaces of the surface portion of the base steel sheet of the sample from which the hot dip galvanizing layer has been removed in the same manner described above, the amount of oxygen in steel was separately determined. Then, the increase in weight due to oxidation only of the surface portion of the base steel sheet was calculated by subtracting the amount of oxygen in the oxides of the sample described above from the amount of oxygen in the oxides in the surface portion of the base steel sheet after the hot dip galvanizing layer had been removed, and the calculated value was converted into the amount per unit area. The results are given in Table 2. The surface after the hot dip galvanizing layer had been removed was the surface portion, and the thickness of 100 µm was confirmed by determining the thickness of the steel sheet.

The surface roughness Ra of a hot dip galvanizing layer was determined using the following method. An arithmetic average roughness Ra was determined using a tracer-type surface roughness meter in accordance with JIS B 0601. The determined results are given in Table 2.

Glossiness (G value) was determined using a gloss meter. The determined results are given in Table 2.

By determining a crystal orientation degree in the (002) plane of a Zn crystal and a crystal orientation degree in the (004) plane of a Zn crystal of a surface of a hot dip galvanizing layer using an X-ray diffractometer, an orientation ratio (Zn(002)/(004)) of the zinc basic plane was derived. The orientation ratios of the zinc basic plane are given in Table 2.

Coating adhesiveness in the worked portion after press working had been performed (impact-resistant adhesiveness in Table 2) was evaluated, by performing an impact resistance test in which a punch having a weight of 1843 g and a punch diameter of 5/8 inches was allowed to fall from a height of 1 m onto a portion which had been subjected to circular truncated cone bulging (corresponding to press forming) under a condition of a decrease ratio in thickness of 5%, and by performing a cellophane tape peeling test. When peeling occurred was judged as unsatisfactory adhesiveness (×), and when peeling did not occur was judged as the case of satisfactory adhesiveness (○). The evaluation results are given in Table 2 (impact-resistant adhesiveness).

Using a JIS No. 5 tensile test piece which had been collected from the hot dip galvanized steel sheet so that the longitudinal direction of the test piece was at an angle of 90° to the rolling direction, a tensile test was performed in accordance with JIS Z 2241 under a condition of a constant cross head speed of 10 mm/min to determine tensile strength (TS (MPa)), elongation (El (%)), and yield stress (YS (MPa)). When YS was 340 to 420 MPa was judged as satisfactory.

Spot weldability was evaluated by performing consecutive spotting using spot welding. Specifically, after degreasing the hot dip galvanized steel sheet having a thickness of 0.8 mm, a consecutive spotting number was investigated using a DR6 electrode having a tip diameter of 6 mm under welding conditions such that the pressing force was 250 kgf, the initial pressing time was 35 cy/60 Hz, the energizing time was 18 cy/60 Hz, the holding time was 1 cy/60 Hz, the pausing time was 16 cy/60 Hz, the welding current was 10 kA, and the nugget diameter was 4√t (t represents the thickness) or more. When the consecutive spotting number was 2000 or more was judged as satisfactory (○), and when the consecutive spotting number was less than 2000 was judged as unsatisfactory (×). The results are given in Table 2.

By performing a chemical conversion treatment, electrocoating, middle coating, and top coating on the hot dip galvanized steel sheet obtained as described above, after-painting beautiful appearance quality was evaluated by performing a visual test. When there was no poor beautiful appearance such as non-uniform coating was judged as satisfactory (○), and when there was poor beautiful appearance was judged as unsatisfactory (×). The evaluation results are given in Table 2.

By performing a chemical conversion treatment, electrocoating, middle coating, and top coating on a portion which had been subjected to circular truncated cone bulging, after-painting corrosion resistance was evaluated using the following method. By performing a salt spray test in accordance with JIS Z 2371 (2000 AD) for 10 days, it was evaluated whether or not swelling occurred in a worked portion after press working had been performed. When swelling occurred was judged as unsatisfactory (×), and when swelling did not occur was judged as satisfactory (○). The evaluation results are given in Table 2.

Table 2-1

| Class | Steel Grade | Thickness/ mm | Hot Rolling Condition CT (° C.) | Cold Rolling Reduction/ % | Annealing Temperature (° C.) | $H_2$ Concentration (vol %) | Dewpoint (° C.) | LS (m/min) | Bath Temperature (° C.) | Al Concentration (mass %) | SK (%) | SK Roll |
|---|---|---|---|---|---|---|---|---|---|---|---|---|
| Example 1 | A | 0.8 | 550 | 65 | 800 | 5 | −42 | 100 | 450 | 0.19 | 1 | EDT |
| Example 2 | A | 1.8 | 560 | 60 | 740 | 10 | −45 | 60 | 450 | 0.19 | 1 | EDT |
| Example 3 | A | 0.8 | 490 | 65 | 810 | 5 | −38 | 100 | 450 | 0.23 | 1 | EDT |
| Example 4 | A | 0.8 | 550 | 65 | 790 | 8 | −45 | 100 | 460 | 0.19 | 1 | EDT |
| Example 5 | A | 0.8 | 480 | 65 | 820 | 5 | −51 | 100 | 450 | 0.19 | 0.9 | EDT |
| Example 6 | A | 0.8 | 550 | 65 | 780 | 8 | −37 | 100 | 450 | 0.19 | 1.1 | EDT |
| Comparative Example 1 | A | 0.8 | 530 | 65 | 800 | 5 | −33 | 100 | 480 | 0.15 | 1 | EDT |
| Comparative Example 2 | A | 0.8 | 700 | 65 | 800 | 5 | 2 | 100 | 450 | 0.19 | 1 | EDT |
| Comparative Example 3 | A | 0.8 | 550 | 65 | 800 | 6 | −40 | 100 | 450 | 0.19 | 0.1 | EDT |
| Comparative Example 4 | A | 0.8 | 510 | 65 | 800 | 5 | −38 | 100 | 450 | 0.26 | 1 | EDT |
| Comparative Example 5 | A | 0.8 | 550 | 65 | 800 | 5 | −37 | 100 | 450 | 0.19 | 1.5 | EDT |
| Comparative Example 6 | B | 0.8 | 470 | 65 | 810 | 5 | −38 | 100 | 450 | 0.19 | 0.8 | EDT |
| Comparative Example 7 | C | 1.8 | 520 | 60 | 750 | 5 | −37 | 60 | 450 | 0.19 | 0.9 | EDT |
| Comparative Example 8 | D | 0.8 | 530 | 65 | 800 | 5 | −44 | 100 | 450 | 0.19 | 0.9 | EDT |
| Comparative Example 9 | E | 0.8 | 550 | 65 | 800 | 5 | −43 | 100 | 450 | 0.19 | 1 | EDT |
| Example 7 | F | 0.8 | 540 | 65 | 805 | 6 | −38 | 105 | 451 | 0.19 | 1 | EDT |
| Example 8 | G | 0.8 | 550 | 65 | 796 | 7 | −39 | 101 | 453 | 0.18 | 1 | EDT |

Table 2-2

| Class | Steel Grade | Surface Portion of Base Steel Internal Oxidation Amount (g/m$^2$) | Intermetallic Compound Al Content (g/m$^2$) | Intermetallic Compound Grain Diameter (μm) | Intermetallic Compound Main Composition | Al Content in Galvanizing Layer (mass %) | Surface Roughness Ra | Glossiness | Orientation Ratio of Zinc Basic Plane (G Value) | Impact Resistant Adhesiveness | After-Painting Corrosion Resistance | Mechanical Property YS | TS | El | Spot Weldability | Aesthetic Appearance Quality |
|---|---|---|---|---|---|---|---|---|---|---|---|---|---|---|---|---|
| Example 1 | A | 0.010 | 0.17 | 0.5 | Fe$_2$Al$_5$ | 0.4 | 1.1 | 650 | 75 | ○ | ○ | 360 | 460 | 37 | ○ | ○ |
| Example 2 | A | 0.010 | 0.16 | 0.6 | Fe$_2$Al$_5$ | 0.4 | 1.1 | 650 | 75 | ○ | ○ | 350 | 440 | 38 | ○ | ○ |
| Example 3 | A | 0.030 | 0.21 | 0.7 | Fe$_2$Al$_5$ | 0.5 | 1.1 | 700 | 70 | ○ | ○ | 360 | 462 | 37 | ○ | ○ |
| Example 4 | A | 0.010 | 0.15 | 0.4 | Fe$_2$Al$_5$ | 0.4 | 1.1 | 650 | 75 | ○ | ○ | 355 | 456 | 37 | ○ | ○ |
| Example 5 | A | 0.001 | 0.17 | 0.5 | Fe$_2$Al$_5$ | 0.4 | 0.95 | 710 | 68 | ○ | ○ | 365 | 470 | 37 | ○ | ○ |
| Example 6 | A | 0.010 | 0.17 | 0.6 | Fe$_2$Al$_5$ | 0.4 | 1.3 | 630 | 75 | ○ | ○ | 353 | 453 | 37 | ○ | ○ |
| Comparative Example 1 | A | 0.011 | 0.10 | 0.3 | Fe$_2$Al$_5$ | 0.2 | 1.1 | 800 | 50 | × | × | 364 | 471 | 37 | ○ | × |
| Comparative Example 2 | A | 0.100 | 0.25 | 1.1 | Fe$_2$Al$_5$ | 0.4 | 1 | 770 | 55 | × | × | 365 | 449 | 37 | × | ○ |
| Comparative Example 3 | A | 0.010 | 0.16 | 0.2 | Fe$_2$Al$_5$ | 0.4 | 0.6 | 510 | 91 | × | × | 335 | 420 | 40 | ○ | ○ |
| Comparative Example 4 | A | 0.008 | 0.31 | 1.1 | Fe$_2$Al$_5$ | 0.7 | 1.1 | 550 | 65 | × | ○ | 365 | 471 | 37 | × | ○ |
| Comparative Example 5 | A | 0.010 | 0.17 | 0.6 | Fe$_2$Al$_5$ | 0.4 | 1.8 | 650 | 75 | × | ○ | 430 | 501 | 32 | ○ | ○ |

-continued

| | | | | | | | | | | | | | | | |
|---|---|---|---|---|---|---|---|---|---|---|---|---|---|---|---|
| Comparative Example 6 | B | 0.020 | 0.18 | 0.5 | Fe$_2$Al$_5$ | 0.4 | 1.1 | 640 | 75 | ○ | ○ | 300 | 370 | 40 | ○ | ○ |
| Comparative Example 7 | C | 0.005 | 0.11 | 0.3 | Fe$_2$Al$_5$ | 0.4 | 0.9 | 650 | 73 | x | x | 440 | 511 | 35 | ○ | x |
| Comparative Example 8 | D | 0.010 | 0.16 | 0.5 | Fe$_2$Al$_5$ | 0.4 | 1.1 | 660 | 75 | x | ○ | 410 | 496 | 35 | x | ○ |
| Comparative Example 9 | E | 0.009 | 0.17 | 0.4 | Fe$_2$Al$_5$ | 0.4 | 1.1 | 650 | 75 | x | ○ | 370 | 446 | 33 | x | ○ |
| Example 7 | F | 0.010 | 0.17 | 0.5 | Fe$_2$Al$_5$ | 0.4 | 1.1 | 650 | 75 | ○ | ○ | 363 | 423 | 37 | ○ | ○ |
| Example 8 | G | 0.010 | 0.17 | 0.5 | Fe$_2$Al$_5$ | 0.4 | 1.1 | 650 | 75 | ○ | ○ | 355 | 421 | 34 | ○ | ○ |

As Table 2 indicates, it is clarified that our hot dip galvanized steel sheets were excellent in terms of beautiful appearance, spot weldability, and yield stress. In addition, our hot dip galvanized steel sheets were excellent in terms of coating adhesiveness and after-painting corrosion resistance despite having been subjected to press working.

The invention claimed is:

1. A hot dip galvanized steel sheet, comprising:
    a steel sheet having a chemical composition containing, by mass %, C: 0.03% or more and 0.07% or less, Si: 0.10% or less, Mn: 0.5% or more and 0.9% or less, P: 0.020% or more and 0.050% or less, S: 0.010% or less, Nb: 0.010% or more and 0.035% or less, N: 0.005% or less, Al: 0.10% or less, and the balance being Fe and inevitable impurities,
    a hot dip galvanizing layer containing 0.3 mass % or more and 0.6 mass % or less of Al which is formed on the surface of the steel sheet, and
    an intermetallic compound layer containing 0.12 gm$^{-2}$ or more and 0.22 gm$^{-2}$ or less of Al and Fe$_2$Al$_5$ having an average grain diameter of 1 μm or less, the intermetallic compound being present between the steel sheet and the hot dip galvanizing layer,
    wherein a yield stress (YS) is 340 MPa or more and 420 MPa or less.

2. The hot dip galvanized steel sheet according to claim 1, wherein the steel sheet has a surface roughness Ra of a surface of the hot dip galvanizing layer of 0.8 μm or more and 1.6 μm or less,
    a glossiness (G value) of the surface of the hot dip galvanizing layer is 550 or more and 750 or less,
    an orientation ratio (Zn(002)/(004)) of the zinc basic plane, which is a ratio of a crystal orientation degree in the (002) plane of a Zn crystal to a crystal orientation degree in the (004) plane of a Zn crystal, is 60% or more and 90% or less on the surface of the hot dip galvanizing layer, and
    an internal oxidation amount is 0.050 gm$^{-2}$ or less in a surface portion of the steel sheet.

* * * * *